United States Patent [19]

Matsuki et al.

[11] Patent Number: 4,724,515
[45] Date of Patent: Feb. 9, 1988

[54] VEHICLE-USE LAMP FIXTURE AND BRAKING INDICATOR MECHANISM

[75] Inventors: Toshihiro Matsuki, Hadano; Eiichi Ono, Atsugi, both of Japan

[73] Assignee: Nissan Motor Co., Ltd., Yokohama, Japan

[21] Appl. No.: 853,985

[22] Filed: Apr. 21, 1986

[30] Foreign Application Priority Data

Apr. 26, 1985 [JP] Japan ................................ 60-88733
Apr. 26, 1985 [JP] Japan ................................ 60-88734

[51] Int. Cl.⁴ .......................................... F21V 29/00
[52] U.S. Cl. ........................................ 362/80; 362/96; 362/294; 362/268; 340/87
[58] Field of Search ................ 362/61, 80, 293, 294, 362/268, 331, 373, 96, 368, 369; 340/69, 84, 87, 135, 97

[56] References Cited

U.S. PATENT DOCUMENTS

| | | | |
|---|---|---|---|
| 2,153,147 | 4/1939 | Lintern .................................. | 340/87 |
| 4,449,167 | 5/1984 | Cohen ................................... | 340/87 |
| 4,546,420 | 10/1985 | Wheeler et al. ..................... | 362/373 |
| 4,626,967 | 12/1986 | Segoshi ................................ | 362/80 |
| 4,654,757 | 3/1987 | Birkhauser ........................... | 362/61 |

FOREIGN PATENT DOCUMENTS

| | | | |
|---|---|---|---|
| 2069120 | 8/1981 | United Kingdom ................ | 362/294 |
| 2419091 | 11/1975 | Fed. Rep. of Germany ...... | 362/373 |
| 57-74237 | 5/1985 | Japan . | |

Primary Examiner—William A. Cuchlinski, Jr.
Assistant Examiner—D. M. Cox
Attorney, Agent, or Firm—Schwartz, Jeffery, Schwaab, Mack, Blumenthal & Evan

[57] ABSTRACT

A vehicle-use lamp fixture unit which can prevent dimming of a lamp due to fogging is provided. The unit comprises a bulb (light bulb); a lens for transmitting light from the bulb; a rear window glass at a position facing the lens; a case for enclosing the bulb and the lens, an open end of the case being in contact with the rear window glass; an air suction passage extending from an exhaust port of a defroster and passing through a space formed between the lens and the rear window glass; and an air exhaust passage for exhausting air from the space. A braking indication mechanism connected to a brake pedal is also provided.

20 Claims, 9 Drawing Figures

VEHICLE-USE LAMP FIXTURE AND BRAKING INDICATOR MECHANISM

BACKGROUND OF THE INVENTION

1. Field of the Invention

The present invention relates to a vehicle-use lamp fixture and braking indicator mechanism, and more particularly to a lamp fixture and braking indicator mechanism for a vehicle in which the light does not become dim due to fogging of a rear window glass, the lamp lights up simultaneously with braking and the light is easily recognized by the drivers of the cars following the vehicle.

2. Description of the Prior Art

Presently, stop lamps (brake lamps) are provided on the automotives, etc., as one of vehicle-use lamp fixtures to inform the vehicles following them that they are being braked under running.

Generally, the installation positions of the stop lamps are on a chassis panel located above a rear bumper; that is, on a rear end panel. When a brake pedal is stepped on, the stop lamp lights up to inform the vehicles following it that it is being braked. Since the aforementioned stop lamps are located above the rear bumper, they can be seen without hindrance by the vehicle that is at the immediate rear of the vehicle itself. Recently, in order that the braking can be distinctly recognized not only by the second car following it but also by other following cars, a 'high-mount' stop lamp besides the normal stop lamps is being provided at a position much higher than the normal stop lamps. An example of this 'high-mount' stop lamp 101 is shown in FIG. 1, where a lamp fixture body 107 is arranged in such a way that a lens surface 105 of the lamp 101 faces a rear window glass plate 103. The surrounding of the lens surface 105 is enclosed by a lamp case 109 which is in contact with the glass plate 103. Such a construction is, for example, mentioned in Japanese Patent Publication No. 57-74237.

Regarding the high-mount stop lamp 101, if the irradiated light from the lamp leaks into the passenger room of the vehicle by reflecting on the window glass, then the lamp is in violation of the regulations. Therefore, the surroundings of the lens surface 105 is enclosed in the lamp case 109 made of a material which can cut-off light to form an enclosed space 111 between the glass plate 103 and the lens surface 105.

Although the rear window glass plate 103 is wired with a defogger heat-wire to prevent fogging, the lamp case 109 is located such that it avoids the heat-wire, because it may get, depending upon its material, if it comes in direct contact with the heat-wire.

Consequently, as the closed space 111 surrounded by the lamp case 109 is placed outside the area of the defogger heat-wire, the glass surface 113 of the glass plate 103 within the closed space 111 gets easily fogged. However, as this is a closed space, the fog cannot be eliminated, and for this reason the light permeability of lens surface 105 becomes poor. As a result, the recognizable distance of the stop lamp becomes remarkably short and this is undersirable from the point of safety.

SUMMARY OF THE INVENTION

An object of the present invention is to provide a lamp fixture for the vehicles in which a lens and the surface of a rear window facing the lens do not get fogged.

Another other object of the present invention is to provide a lamp fixture for the vehicles in which air can be blown in between a lamp lens and a rear window glass to eliminate fogging.

The other object of the present invention is to provide a braking indicator mechanism for the vehicles, in which a lamp is lit up simultaneously with the braking and a fog preventing blower motor is operated at the same time.

To realize the above objectives, the vehicle-use lamp fixture according to the present invention comprises: a bulb (lamp bulb); a lens through which the light from the bulb gets transmitted; a rear window glass at the position facing the lens; a case for enclosing the bulb and the lens with its open end in contact with the rear window glass; an air suction passage from a defroster exhaust port through a space formed inbetween the lens and the rear window glass; and an air exhaust passage for exhausting air from the space.

Furthermore, the vehicle-use braking indicator mechanism according to the present invention comprises a lamp fixture fitted to a rear window glass, comprising a bulb (lamp bulb), a lens, an air suction passage from a defroster exhaust port through a space formed inbetween the lens and the rear window glass, and an air exhaust passage for exhausting air from the space; a blower motor connected to the defroster exhaust port; and a switch connected to a brake pedal for lighting up the bulb and operating the blower motor simultaneously with braking.

DESCRIPTION OF THE PREFERRED EMBODIMENTS

Figure 2:
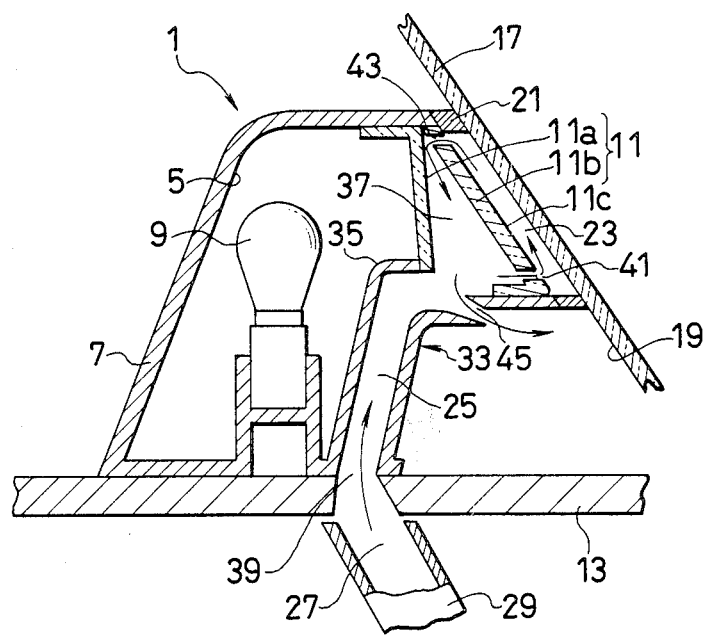
FIG. 2 is a sectional view of a first embodiment of a lamp fixture according to the present invention.
Figure 3:
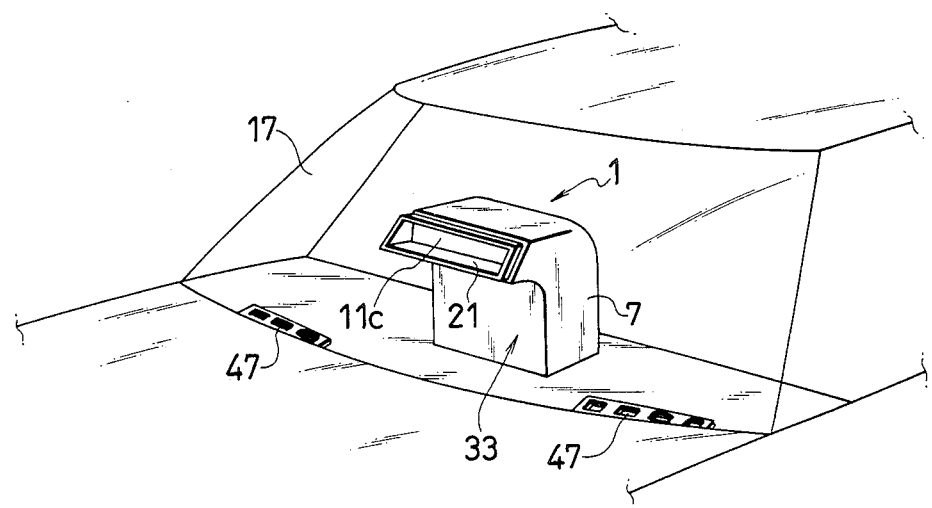
FIG. 3 is a perspective view of the first embodiment.

Embodiments of the present invention will now be explained referring to FIGS. 2 through 9, in which FIGS. 2 and 3 relate to the first embodiment.

Figure 1:
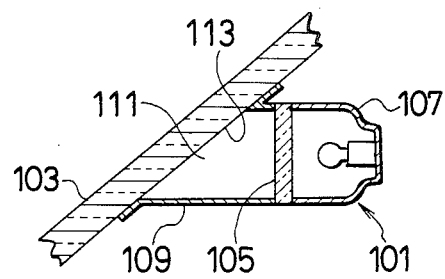
FIG. 1 is a sectional view of a prior art lamp fixture of vehicles.

In the figures, the numeral 1 denotes a high-mount stop lamp which is provided as a separate unit independent of existing stop lamps (FIG. 1) which are placed at the rear of a passenger car.

The high-mount stop lamp 1 comprises a bulb 9 and a lens assembly 11. The bulb 9 is integrated into a lamp fixture case 7 whose internal surface is formed as a reflecting mirror 5, and the bulb is lit up with the pressing of a brake pedal (not shown). The lens assembly 11 consists of a colourless transparent inner lens 11*a* and a transparent red coloured outer lens 11*b*. The lamp fixture case 7 is stuck on the rear parcel shelf panel 13. A lens surface 11c of the outer lens 11b is placed to be in parallel with a rear window glass 17 which is provided with a defogger heat-wire 15 (FIG. 9) so that the lens surface 11c can be recognized by the vehicles following it.

Figure 8:
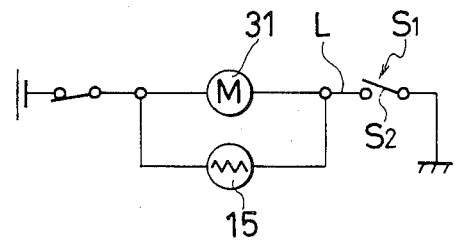
FIG. 8 is an electrical circuit diagram of a braking indicator mechanism according to the present invention.
Figure 9:
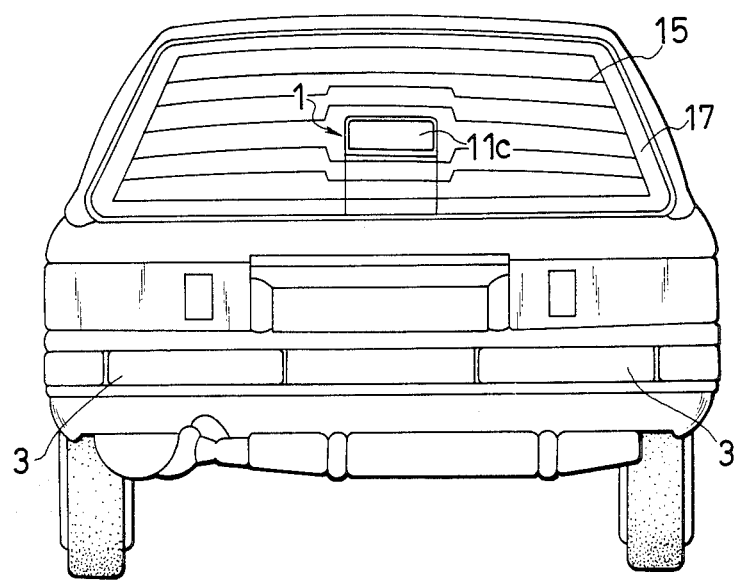
FIG. 9 is a rear view of an automobile installed iwth a lamp fixture according to the present invention.

The defogger heat-wire 15 is incorporated in an electric circuit L containing a defogging switch S1 (FIG. 8). The heat-wire 15 is a printed wiring against the inner window glass surface 19 of the rear window glass 17 which is installed such that it avoids the lamp fixture case 7. Moreover, the lens surface 11C is surrounded by a lamp fixture case 21 which is in contact with the window glass surface 19 of the rear window glass 17 to form a closed space 23 inbetween the rear window glass 17 and the lens surface 11c to prevent leakage of irradiated light into the passenger room.

In the vicinity of the lamp fixture case 7, on the rear parcel shelf panel 13, there is provided a defroster exhaust outlet 27 which is connected to the closed space 23 via an induction passage 27. This exhaust outlet 27 communicates with a blower motor 31 via a defroster duct 29.

The blower motor 31, as shown in FIG. 8, is wired in parallel with the defogger heat-wire 15 and is turned ON simultaneously with the defogger heat-wire 15 when a contact S2 of the defogger switch S1 is closed.

The induction passage 25 is an independent passage which is guided by a guide plate 35 provided at the inner side of a window side unit case 33 and continued to a lens space 37 formed inbetween the inner lens 11a and the outer lens 11b. An air suction inlet 39 at the starting end side of the induction passage 25 is connected to communicate with the defroster exhaust outlet 27. Moreover, the ending side of the induction passage 25 forms an aperture 41 at the lower part of the outer lens 11b to blow air toward a part of the window glass surface 19 located within the closed space 23.

Furthermore, at the upper part of the outer lens 11b, a communication port 43 is provided to let the air in the closed space 23 escape to the lens space 37. The air inside the lens space 37 is blown out via a plurality of air exhaust ports 45 which are open at the bottom of the space 37.

The air exhaust ports 45 are shaped to blow out air towards the window glass surface 19 under the lens 11. In FIG. 2, the numeral 47 denotes respective ventilation ports provided on the rear parcel shelf panel 13.

With the high-mount stop lamp 1 configured in this way, when fogging occurs on the rear window glass surface 19, the contact S2 of the defogger switch S1 is closed. This actuates the blower motor 31 and the defogger heat-wire 15. As the defogger heat-wire 15 starts to generate heat, the fogging of the rear window glass surface 19 excluding the closed space 23 disappears. On the other hand, with the action of the blower motor 31, the air through the defroster outlet 27 is blown towards the rear window glass surface 19 within the closed space 23 via the air suction inlet 39, the induction passage 25, and the gap 41 to remove the fogging of the rear window glass 19 facing the closed space 23. As a result, the vehicles following the subject vehicle with the high-mount stop lamp can positively recognize the light of the high-mount stop lamp from a distance.

After the above operation, the air inside the closed space 23 is blown out via the communication port 43, the lens space 37, and the air exhaust outlet 45. At this time, the dust, etc., which sticks to the window glass surface 19 below the lens 11 is swept away by the wind blown through the air exhaust port 45.

The second embodiment of the present invention will now be explained.

Figure 4:
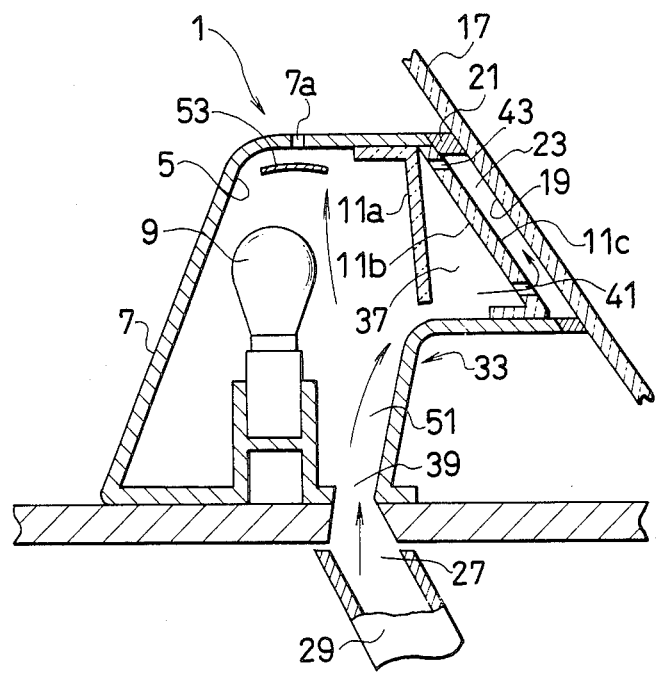
FIG. 4 is a sectional view of a second embodiment of the lamp fixture according to the present invention.

In FIG. 4, the second embodiment according to the present invention is shown with a modified induction passage.

In this embodiment, an induction passage 51 comprises the internal space of the light fixture case 7 which communicates with the lens space 37. An air suction port 39 provided at the lower part of the induction passage 51 is connected to communicate with the defroster exhaust outlet 27. The termination side of the induction passage 51 continues up to an aperture 41 under the outer lens 11b and is shaped to blow air towards the window glass surface 19 inside the closed space 23. On the other hand, a part of the air inside the window side unit case 33 is made to escape through an opening 7a provided on the lamp fixture case 7. The opening 7a is provided with an interceptor plate 53 to prevent leakage of light to the outside through opening 7a. The remaining parts of the configuration are identical to the first embodiment so their reference marks are the same as those in the first embodiment and their explanations will be omitted here.

In accordance with this second embodiment, while the fogging of the window glass surface 19 within the closed space 23 is removed, the bulb 9 can be cooled, thereby prolonging the life of the bulb.

The third embodiment according to the present invention will now be described with reference to FIGS. 5 through 6 where the configuration of air flow path and the material of lamp fixture case end 21 differ from those of the embodiments 1 and 2.

In the following, only the portions with special features will be explained and explanations for the portions common to the first and second embodiments will be omitted here.

Figure 5:
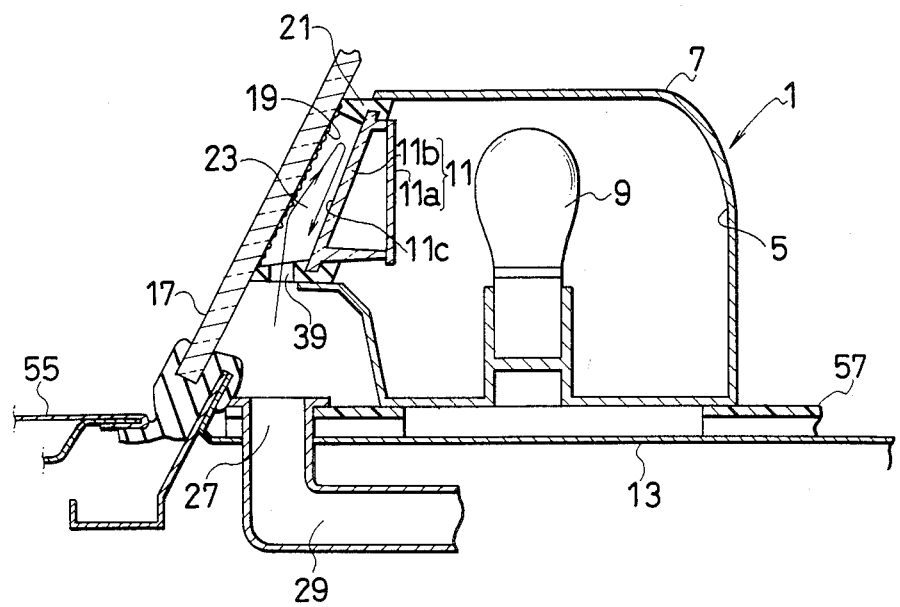
FIG. 5 is a sectional view of a third embodiment of the lamp fixture according to the present invention.
Figure 6:
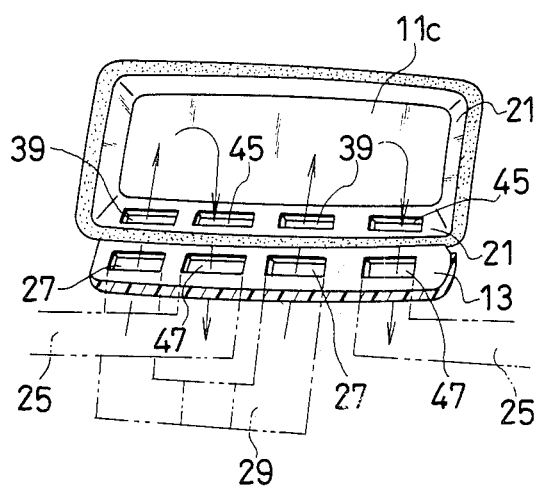
FIG. 6 is a diagonal view of the essential parts of the third embodiment.
Figure 7:
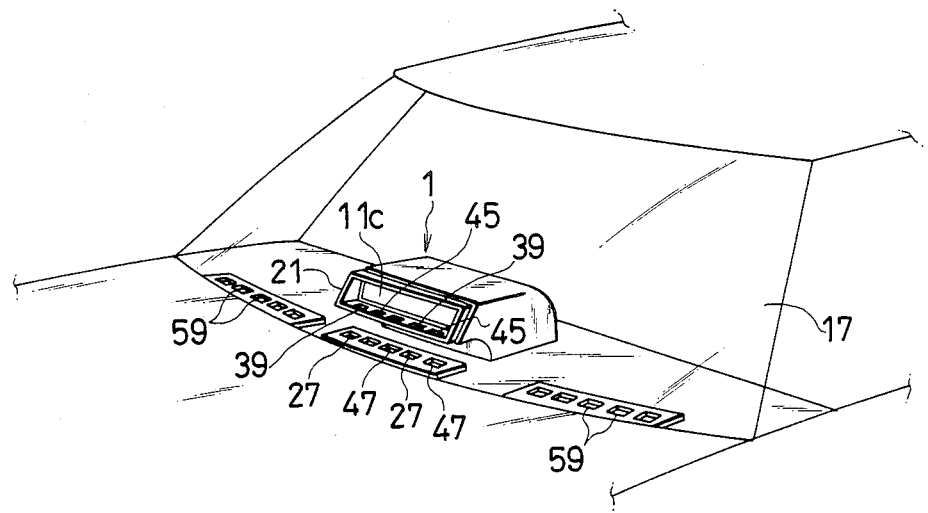
FIG. 7 is a perspective diagonal view of the third embodiment.

In FIG. 5, the lamp fixture case end 21 which encloses the closed space 23 between the outer lens 11b and rear window glass 17 is made of an elastic material.

The space in between the inner lens 11a and the outer lens 11b is made completely air tight, to cause no fogging therein and therefore no air need to be passed through here for defogging.

At the lower vicinity of the light fixture case end 21 made of the elastic material, air suction ports 39 and air exhaust ports 45 are respectively formed to face the defroster exhaust outlets 27 an the ventilation ports 47 provided on the rear parcel shelf panel 13. Each air suction port 39 is shaped to guide air towards the window glass surface 19.

The defroster exhaust outlets 27 which are placed directly below the air suction ports 39 are continued upto the blower motor 31 via the defroster duct 29.

Ventilation exhaust ports 59 provided on the rear parcel shelf panel 13 are in communication with the defroster ventilation ports 47 via connecting ducts 25. The numerals 55 and 57 denote respectively a truck lid and a parcel trim.

When fogging occurs in the high-mount stop lamp 1 configured in this way, the contact S2 of the defogger switch S1 is closed to actuate the blower motor 31 and the defogger heat-wire 15 by which the fogging of the rear window glass 17 excluding the closed space 23 is removed. On the other hand, with the operation of blower motor 31, the air blown out from the exhaust ports 27 is led to the window glass surface 19 through the air suction ports 39 to strike the portion of glass surface 19 within the closed space 23 to remove fogging therefrom. Thereafter, the air within the closed space 23 on completion of its work is led through the air exhaust ports 45 and ventilation ports 47, and expelled outside of the vehicle.

Accordingly, the vehicles following the subject vehicle can clearly recognize the illumination of the stop lamp via the rear and the front window glass even from a distance, because the window glass surface 19 has entirely been defogged.

Various modifications will become possible for those skilled in the art after receiving the teachings of the present disclosure without departing from the scope thereof.

What is claimed is:

1. A vehicle-use lamp fixture unit, provided on a rear window glass pane comprising:
   a bulb for emitting light outward through the pane;
   a case for enclosing said bulb to prevent the light of said bulb from entering the passenger compartment, an open end of said case being in contact with said rear window glass pane;
   an air passage formed inside of the inner surface of the pane irradiated with the light, said air passage communicating with the outside of the vehicle thorugh a ventilation port.

2. A vehicle-use lamp fixture as claimed in claim 1 wherein said bulb is provided with lens comprising an inner lens and an outer lens.

3. A vehicle-use lamp fixture unit according to claim 2, wherein said passage includes a space which is formed between said outer lens and said rear window glass pane.

4. A vehicle-use lamp fixture unit according to claim 2, wherein said passage includes a space which is formed between said inner lens and said rear window glass pane.

5. A vehicle-use lamp fixture unit according to claim 2, wherein said outer lens is held in parallel with said rear window glass and colored in red.

6. A vehicle-use lamp fixture as claimed in claim 1 wherein said air passage is open to the passenger compartment of the vehicle.

7. A vehicle-use lamp fixture unit, provided on a rear window glass pane comprising:
   a bulb for emitting light outward through the pane;
   a lens comprising an inner lens and an outer lens;
   a case for enclosing said bulb to prevent the light of said bulb from entering the passenger cmpartment, said case having an open end in contact with said rear window glass pane and said case and said lens enclosing a fixture body side space;
   an air passage formed inside of the inner surface of the pane irradiated with the light and including a first space formed between said outer lens and said pane and a second space formed between said inner lens and said pane, said air passage communicating with said space located on the fixture body side.

8. A vehicle-use lamp fixture unit according to claim 7 wherein said case is provided with at least one air exhaust hole.

9. A vehicle-use lamp fixture as claimed in claim 7 wherein said outer lens is held in parallel with said rear window glass pane and is colored in red.

10. A vehicle-use lamp fixture as claimed in claim 7 wherein said air passage is open to the passenger compartment of the vehicle.

11. A vehicle-use lamp fixture unit provided on a rear window glass pane comprising:
   a bulb for emitting light outward through the pane having an inner lens and an outer lens;
   a case for enclosing said bulb to prevent the light of said bulb from entering the passenger compartment, an open end of said case being in contact with said rear window glass pane and a portion of said case made of an elastic material and enclosing a space formed between said outer lens and said rear window glass;
   an air passage formed inside of the inner surface of the pane irradiated with the light.

12. A vehicle-use lamp fixture as claimed in claim 11 wherein said air passage includes a space which is formed between said inner lens and said rear window glass pane.

13. A vehicle-use lamp fixture as claimed in claim 11 wherein said outer lens is held in parallel with said rear window glass pane and is colored in red.

14. A vehicle-use lamp fixture as claimed in claim 11 wherein said air passage is open to the passenger compartment of the vehicle.

15. A vehicle-use lamp fixture unit provided on a rear window glass pane comprising:
   a bulb for emitting light outward through the pane and having an inner lens and an outer lens;
   a case for enclosing said bulb to prevent the light of said bulb from entering the passenger compartment, an open end of said case being in contact with said rear window glass pane;
   an air passage formed inside of the inner surface of the pane irradiated with the light said air passage communicating with a space between said outer lens and said rear window glass, and with a space between said outer lens and said inner lens.

16. A vehicle-use lamp fixture as claimed in claim 15 wherein said outer lens is held in parallel with said rear window glass pane and is colored in red.

17. A vehicle-use lamp fixture as claimed in claim 15 wherein said air passage is open to the passenger compartment of the vehicle.

18. A lamp fixing unit for a vehicle disposed in a rear portion of the vehicle compartment adjacent a rear window pane, said lamp fixing unit comprising:
   means for emitting light;
   a light permeable means facing the rear window pane and adjacent thereto;
   a casing for enclosing said light emitting means to direct the light thereof toward the rear direction of the vehicle through the light permeable means and the rear window pane, said casing forming a closed space in cooperation with the light permeable means and the rear window pane; and
   means for removing cloudiness generated on the inside surface of the rear window pane, including guide means for directing air onto the inside surface of the rear window pane through said closed space.

19. A lamp fixing unit for a vehicle as claimed in claim 18, wherein said guide means comprises an intake port connected to a defroster and communicating with a blow-out port formed between the casing and the light permeable means, said blow-out port for blowing out the air from the intake port onto the inside surface of the rear window pane.

20. A lamp fixing unit for a vehicle as claimed in claim 18, wherein said lamp fixing unit further comprises an exhaust port for externally discharging the air within said closed space.

* * * * *